United States Patent [19]
Seidenfaden

[11] 3,790,153
[45] Feb. 5, 1974

[54] EQUIPMENT FOR HOLDING WORKPIECES

[75] Inventor: Heinz Seidenfaden, Varel/Oldb, Germany

[73] Assignee: Vereinigte Flugtechnische Werke-Fokker Gesellschaft mit beschrankter Haftung, Bremen, Germany

[22] Filed: Oct. 24, 1972

[21] Appl. No.: 299,996

[30] Foreign Application Priority Data
Oct. 27, 1971  Germany............................ 2153463

[52] U.S. Cl...................... 269/21, 51/235, 269/296
[51] Int. Cl............................................ B25b 11/00
[58] Field of Search .......... 269/21, 24, 296; 51/235; 29/DIG. 44

[56] References Cited
UNITED STATES PATENTS

| | | | |
|---|---|---|---|
| 3,711,082 | 1/1973 | Seidenfaden.......................... | 269/21 |
| 3,606,300 | 9/1971 | Davis................................... | 269/296 |
| 3,486,441 | 12/1969 | Hillman et al. ...................... | 269/21 X |
| 2,443,987 | 6/1948 | Morrison et al. ................... | 51/235 X |

FOREIGN PATENTS OR APPLICATIONS

| | | | |
|---|---|---|---|
| 144,194 | 2/1954 | Sweden.............................. | 269/296 |

*Primary Examiner*—Roy Lake
*Assistant Examiner*—C. Feinberg
*Attorney, Agent, or Firm*—Smyth, Roston & Pavitt

[57] ABSTRACT

Equipment for mounting workpieces in relation to a machine tool axis as pertaining to the spindle of a cutting, milling or drilling tool or the like, and on a machine tool table which can be placed in particular position relative to the tool. A support table is mounted on the machine tool table for turning on a second axis, which can be placed by the machine tool table in particular relation to the tool axis; a prism is mounted with one end face on the support table, so that at least two of the prism sides have similar distance from the second axis; at least two of the sides are provided each with an array of threaded fitting bores arranged in regular spacing along two coordinates on the respective side, the bores of the arrays being arranged to have similar position for similar dispositions of the two sides in relation to the tool. The prism sides have second bores respectively between four of the fitting bores as forming a quadrilateral, and suction into the second bores is provided for; the sides have grooves interconnecting the second bores; upon turning the table, each of the prism sides is selectably placeable into the same particular position in relation to the tool axis.

8 Claims, 3 Drawing Figures

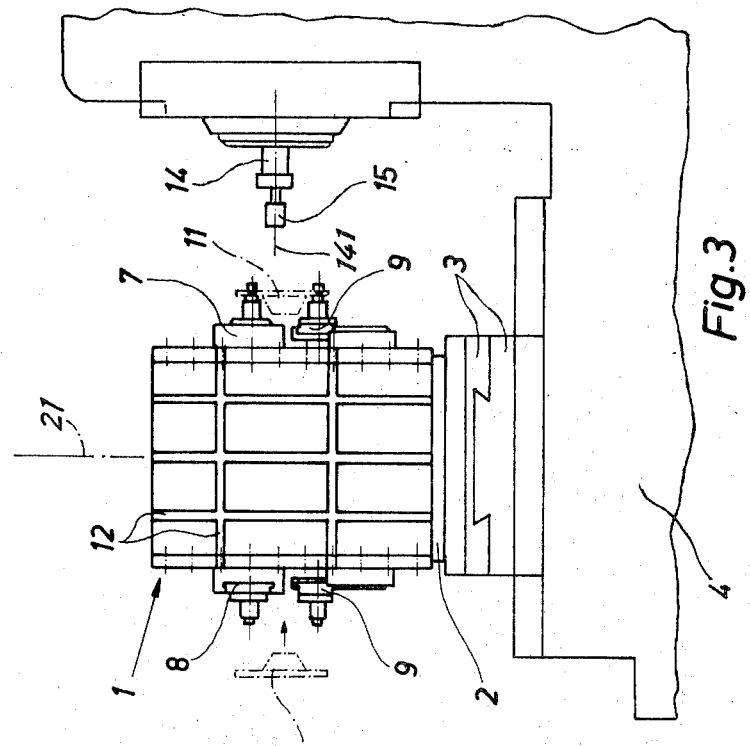
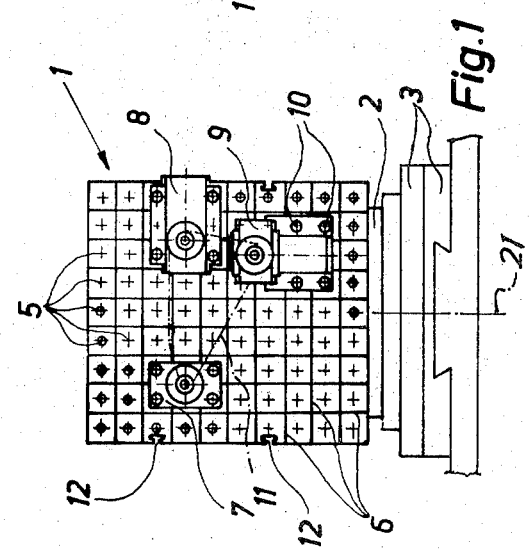
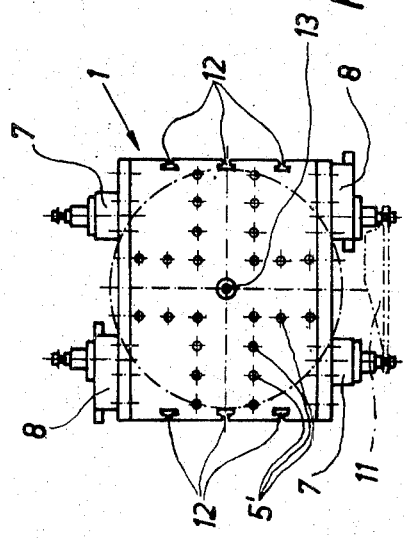

EQUIPMENT FOR HOLDING WORKPIECES

BACKGROUND OF THE INVENTION

The present invention relates to improvements for mounting, holding and positioning workpieces in relation to one or several particular axes as defined, e.g., by a rotating machine tool such as a milling cutter, drill or the like.

Angle clamps are used quite commonly in chucks for fastening workpieces in machine tools having horizontal spindle, such as a horizontal drill or milling cutter. The chuck clamps are provided with longitudinal grooves, and either the work itself or holders are fastened to such angle piece by means of conventional clamping bolts and shoes. This method of holding and fastening a workpiece has the disadvantage that the next piece to be worked can be positioned only after work on the current piece has been completed and that piece has been removed. Thus, setting and preparation periods are rather long. Unless the workpiece can be mounted directly on and by the angle clamp, additional workpiece holders are needed which are matched to the contour thereof or which are otherwise specifically designed for a particular work. Another problem is the accurate positioning of the workpiece relative, e.g. to a drilling or a milling axis. This is particularly important for positioning of plural workpieces in relation to a tool facility which is computer controlled.

Various improved workpiece holding and fastening equipment in conjunction with a machine tool table is disclosed in my copending U.S. Pat. application Ser. No. 32,581, filed Apr. 28, 1970, (now U.S. Letters Patent No. 3,711,082), as well as in German printed Pat. applications No. 1,903,576 and No. 1,923,833, using mounting elements of various kinds. Employment of particular positioning elements on such a tool table in cooperation with suction means as disclosed there, is quite advantageous for obtaining support and fastening which is not disturbed by clamping shoes or the like.

DESCRIPTION OF THE INVENTION

It is an object of the present invention to provide a facility for mounting a workpiece in relation to a, e.g., horizontal spindle axis, so that the preparation times are reduced, and clamping shoes can be avoided.

In accordance with the preferred embodiment of the present invention, it is suggested to provide a support body of prism configuration having one of its parallel end faces mounted (or provided for mounting) on a tool table, workbench etc. At least two of the sides of the prism are provided each with an array of threaded bores as well as with an array of interspaced bores which lead to a suction system. The latter bores are interconnected in the respective surfaces of the sides with channels. One will preferably chose nonintersecting sides of the prism for reason of easy access. The system of channels and bores on the two sides thusly equipped, will cooperate with workholders and mounting elements of the type disclosed in detail in my copending U.S. Pat. application, Ser. No. 32,581, filed Apr. 28, 1970. The disclosure of these holders is incorporated by reference.

The mounting prims is mounted on one of its parallel end faces in relation to the machine tool proper for relative turning motion so as to permit the tool, particularly its axis, to assume similar positions relative to the said mounting sides of the prism. Preferably, but not necessarily, the machine tool is stationary, except for operative tool motion of a drill or controlled milling motion of a cutter etc.

The prism is preferably mounted on a positioning device, which includes a cross-slide supporting a turntable or the like; the prism is mounted on the turntable. One side of the prism holds a workpiece and cooperates with the particular tool. In the meantime, another workpiece can be fastened to the other side of the prism, or to one of the other sides thereof, which has also the bore and channel system as described. This way, work mounting and unmounting proceeds on sides of the mounting prism facing away from the side holding the workpiece that is being worked. If the two mounting sides of the prism have similar distance and orientation to the turning axis of the prism and if the bore system of the two mounting sides have the same orientation as to any particular plane and level, it will be necessary merely to turn the prism on the turntable for placing a new workpiece exactly in the desired relation to the tool.

From a somewhat broader point of view, each mounting side has a pattern of threaded fitting bores which permit mounting of a workpiece, preferably by means of the particular type holders, to the side while facing away from the tool. The mounting position can be selected so that upon relative turning of the mounting prism any new position of the mounted work in relation to the tool is fully predictable, merely by accurate determination of the turning angle.

It can readily be seen that only two mounting sides of the prism are needed generally, one holding the piece that is being worked, while the previously worked piece is replaced by a new one on the other mounting side of the prism, facing away from the tool.

The positioning of the sides of the mounting prism relative to the tool may require a turning motion only, but for one reason or another, a lateral displacement may be superimposed. While preferably the mounting prism turns on an axis, the tool may in cases be turned on such an axis while the prism remains stationary. It can readily be seen that only mounting two sides are needed for this operation. The remaining sides could be equipped with grooves for receiving conventional work holding and clamping shoes or the like. The other (usually upper) end face of the prism may be provided with a center bore as well as with additional threaded bores in particular relation to the center bore. This way, this particular surface can be used also for holding workpieces to be worked, e.g., on end faces, along the periphery etc.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side elevation of a mounting prism on a turntable and machine tool table and showing directly one of the mounting sides of the prism;

FIG. 2 is a top view of the arrangement of FIG. 1; and

FIG. 3 is a view of machine tool with horizontal axis, further showing the mounting prism, turned by 90° as compared with FIG. 1.

Proceeding now to the detailed description of the drawings, a mounting prism 1 sits with one of its parallel end faces on a turntable 2, having axis 21. Turntable 2, in turn, is mounted on a cross-slide 3 for movement in two orthogonal directions in a horizontal plane. Cross-slide 3 is the worktable of a machine tool 4, having a horizontal working spindle 14 with a tool 15 rotating on the horizontal spindle axis 141. The tool may undergo, e.g., program controlled motions which includes motions in and along the axis 141, as well as lateral displacement of the axis. However, if we speak here of a position of the tool axis, this is to mean, for example, the starting position of the axis and tool, e.g., for a controlled cutting operation, for a first drilling operation etc. Of principle interest here are work operations which may require repetition of the same operation on several workpieces.

The prism 1 has rectangular end faces (respectively facing up and down) and four rectangular sides. Two oppositely facing sides are each provided with an identical array of threaded positioning and fitting bores 5; that is to say, either side can be placed in particular relation to the axis of spindle 15, and any bore 5 of one prism side has its counterpart on the other side. The bores 5 on each side are arranged at equidistant spacing along two orthogonal coordinates, horizontal and vertical. These two mounting sides of the prism have similar distance from the axis 21, so that corresponding bores can assume similar positions upon turning prism 1 on its axis which is colinear with vertical axis 21 of the turntable.

The bores 5 are situated each in the center of a square, the squares are formed by two groups of rectangularly intersecting surface grooves or channels 6 in the respective mounting sides of the prism. The intersections of the grooves are provided with suction bores, thus forming an array of bores interspersed in the array of positioning bores 5. One can also say that these suction bores each are situated in the center of a quadrilateral (square) as defined by four bores 5. These bores in the intersections of the grooves or channels 6 all lead to an internal duct system of the prism 1 which, in turn, connects to a suction system, as schematically indicated.

Grooves and intersection bores are sealed to the extent they are exposed; particularly exposed suction bores are plugged. Each of the two sides of the prism having these patterns of bores, carries clamping, holding and mounting elements such as 7, 8 and 9. These elements each have base plates provided with threaded bores which are spaced-apart corresponding to the pattern of bores 5. The base plates of the mounting units are bolted to the prism whereby each mounting unit is now particularly positioned in relation to the pattern of bores 5.

Mounting unit 7, for example, has a central pin or post which assumes a definite position to the pattern of bores 5 when its base is bolted thereto. Unit 8 has a slide movable parallel to the plane of the prism side to which its base is bolted. One or two suction bores underneath the slide unit are not plugged, so that the slide is sucked against the base. Those of grooves 6 tending to provide communication between these unplugged bores and the exterior are sealed.

The unit 9 is a so-called cross-slide and permits adjustment in two orthogonal directions, but in a plane parallel to the side of prism 1 to which such a unit 9 is affixed. Each of the units 8 and 9 has also a mounting pin or bolt. Examples for units 7, 8 and 9 are shown in greater detail in my copending U.S. Pat. application, Ser. No. 32,581 (now U.S. Pat. No. 3,711,082). This patent shows additional mounting elements which are usable here.

As illustrated in FIG. 1, three such mounting elements or units, one of each type, are provided so as to position and to mount a triangular workpiece 11. As shown in FIG. 3, one workpiece faces tool 15 as the one side of prism faces that tool.

The one side of prism 1 shown in elevation in FIG. 3 (as well as the opposite side) may be provided with a system of conventional T-grooves 12 (see FIG. 2) so that the prism 1 may be used to mount conventional holders and clamping shoes. As can be seen specifically from FIG. 2, the upper end face of the prism has a central bore 13 concentrical to the axis of rotation of turntable 2. Positioning bores 5' in the upper face of prism 1 may be arranged in rows as illustrated, whereby the spacing of bores 5' in each row is the same as the spacing of bores 5 in the specific mounting sides of the prism. Thus, this top face of the prism when mounted may hold also mounting units such as 7, 8 and 9. The center bore 13 may receive the center post of an adapter or of a particular mounting device or holder constructed for concentric mounting of a work on an axis.

In operation, and turning here specifically to FIG. 3, one of the improved work holding sides of the prism faces the tool 15 while its holding elements 7 etc. support a workpiece in particular position. That position is defined by the tool 15 and its axis 141, and is established through known pre-association of the pattern of bores 5. The cross-slide table 3 is preferably adjusted here, so that one point of support for a work can be established by a mounting element 7 with a fixed post (see FIG. 1). The mounting elements with slides, such as 8 and 9 are then used to match the support to the particular dimensions of work 11. These mounting elements with slides will also take up length variations the work 11 may undergo.

As the one workpiece is being worked by the tool, the other improved mounting side of prism 1 for holding work faces away from the tool and is readily accessible for mounting another workpiece. Again, the one corresponding support point for a workpiece will be held and positioned by a mounting element 7 with stationary post, and that element is mounted to the bores 5 on that side corresponding to the other element 7 that holds the piece currently worked. One can also say that the fixed mounting post for this one element 7 is precisely 180° from the corresponding post holding the piece that is being worked, and these reference points have identical distance from the axis 21. Accordingly, each point of the newly mounted workpiece assumes a predictable position relative to the tool, after the prism has been turned by 180°.

As work on the one piece is completed, the table 2 is turned by 180° and now the new workpiece has exactly the same position the previous one had during working, so that the tool 15 finds the new workpiece in the desired position. In the meantime, the previously worked piece is removed from the side of prism 1 now facing away from the tool and a new blank is substituted etc. Of course, the utilization of the equipment is not limited for working the same kind of workpiece. The example above merely illustrates that each improved mounting side is provided for mounting a workpiece outside of the working plane of the tool, but in a position that is accurately predictable in relation to the tool and its interaction with the work. Instrumental here is the relation between fitting and positioning bores 5 and the turning axis of the prism. Instrumental here is further the utlization of these individually but accurately and predictably placeable mounting elements 7, 8 and 9, permitting accurate positioning of the mounted work after providing a definite displacement (such as turning table 2 by 180°).

The other sides having mounting grooves 12 can be used analogously for conventionally mounting workpieces, however, the position of each workpiece has to be adjusted in each instant.

The invention is not limited to the embodiments described above but all changes and modifications thereof not constituting departures from the spirt and scope of the invention are inteded to be included.

I claim:

1. Equipment for mounting and positioning workpieces in relation to a machine tool axis as pertaining to the spindle of a milling or drilling tool or the like, comprising:
    support means;
    a mounting prism having two parallel end faces and rectangular sides, the prism mounted with one of the end faces on the support means;
    at least two of the sides of the prism provided each with an array of first threaded, fitting bores arranged with regular spacing along two coordinates on the respective sides, the first bores of the arrays having similar location for similar positions of the two sides in relation to an axis;
    said sides having second bores respectively between four of the fitting bores as forming a quadri-lateral, the prism provided with means for providing suction in the second bores, the sides having channels, open to the sides and interconnecting the second bores; and
    means for providing relative displacement between two relative positions as between the tool axis and said prism, the tool axis having the same relative positions to said sides in each of said positions.

2. Equipment as in claim 1, including mounting elements having threaded bores spaced corresponding to the spacing of the first bores, for bolting to the sides in predetermined position thereon, the mounting elements including at least two, one for each side, and having a fixed mounting post and bolted to the corresponding bores of the first plurality so that the post can assume the same position relative to the tool axis in each of said positions.

3. Equipment as in claim 1, wherein the remaining sides of the prism are provided with interacting clamping grooves.

4. Equipment as in claim 1, there being sealing elements disposed in the grooves.

5. Equipment as in claim 1, the prism being mounted on a turntable, the tool having axis whose position is independent from the rotation of the turntable, the two positions defined by rotation of the turntable over an angle necessary to place the sides into identical positions relative to the tool when its axis has a fixed position.

6. Equipment for mounting workpieces in relation to a machine tool axis as pertaining to the spindle of a cutting, milling or drilling tool or the like, there being a machine tool table, and tool and table can be placed in particular position relative to each other, comprising:
    a support table mounted on the machine tool table for turning on a second axis, the second axis being placed by the machine tool table in particular relation to the tool axis;
    a mounting prism having two parallel end faces and rectangular sides, the prism mounted with one of the end faces on the support table, so that at least two of the sides have similar distance from the second axis;
    at least two of said sides provided each with an array of first threaded fitting bores arranged in regular spacing along two coordinates on the respective side, the bores of the arrays having similar location for similar positions of the two sides;
    said sides having second bores respectively between four of the fitting bores as forming a quadrilateral, the prism provided with means for providing suction in the second bores, the sides having grooves interconnecting the second bores;
    each of said sides being selectably placeable into the same particular position in relation to the tool axes upon turning the table.

7. Equipment as in claim 6, wherein the tool axis is horizontal, the second axis is vertical.

8. Equipment as in claim 6, the prism having a central axis and bore, coaxial with the second axis on the other one of said end faces, there being particularly arranged threaded fitting bores on said other end face.

* * * * *